United States Patent Office 3,278,426
Patented Oct. 11, 1966

3,278,426
CARBOXYLIC ACID AMINE SALTS OR CARBOXYLIC ACID AMIDES-CALCIUM ACETATE COMPLEXES
Dean W. Criddle, Pleasant Hill, Calif., assignor to Chevron Research Company, a corporation of Delaware
No Drawing. Filed Nov. 5, 1964, Ser. No. 409,319
5 Claims. (Cl. 252—17)

This invention concerns novel organic-ionic complex dispersions in fluids and their use in improving or varying the properties of the media. More particularly, this invention concerns complexes of calcium acetate and amine salts or amides in fluid media, wherein the complexes find use as viscosity index improvers, as well as other purposes.

Calcium acetate is a known additive to lubricating oils. Calcium acetate affords a variety of useful properties to the oil. The calcium acetate imparts load-carrying ability, antiwear properties, and because of its basic nature, acid neutralizing activity. Calcium acetate has also been used in combination with other materials to form fluid dispersions, providing greases or heavy lubricants.

Ammonium salts of various carboxylic and inorganic acids have been reported as stabilizers in Indian Patent No. 82,338/62. N-acylsarcosine derivatives have also been reported in combination with calcium acetate as grease thickeners in Belgian Patent No. 619,604.

It has now been found that by combining calcium acetate with a fatty acid (of 4 carbons or higher) amine salt or amide in a hydrocarbon medium at elevated temperatures, novel compositions are obtained which provide viscosity index improvement with excellent storage stability, as well as other uses which will be discussed and illustrated subsequently.

The novel complex is formed by introducing, into a fluid medium—oil of lubricating viscosity—having a boiling point of at least 60° C., calcium acetate and the amine salt (or its components individually) or the preformed amide and heating the mixture with rapid mixing for a brief time to a temperature of at least 150° F. The complex-oil composition is generally prepared as a concentrate which may then be used to improve or modify the properties of other fluid media.

Depending on the particular materials and the particular use, the mole ratio of the carboxylic acid amine salt or amide to calcium acetate will be in the range of about 0.1–6:1, more usually in the range of about 1–5:1. For viscosity index improvement, the mole ratio will generally be about 1–3.5:1.

The concentration of the complex, the solids concentration (as weight percent of the total composition) will, depending upon its use, range from about 0.01 to 35 weight percent, more usually from about 0.1 to 15 weight percent. Preferably, the concentrate of the complex-oil composition will range from about 5 to 12 weight percent. When employing the concentrate in other oil media to modify the properties of the oil media, concentrations as low as 0.01 weight percent may find use, and usually, effective concentrations will be in the range of about 0.02 to 0.5 weight percent.

As indicated, in order to obtain the novel complexes of this invention, the calcium acetate and amide or salt must be heated to at least 150° F., preferably with rapid mixing. These complex-oil compositions are readily prepared in any of a variety of oils, e.g., hydrocarbon, silicates, esters etc. Other inert fluid media may also be used depending on the ultimate use and convenience.

Generally, the temperature will be in the range of about 200° to 500° F., more usually in the range of about 200° to 325° F. It is found, however, that there is no advantage in going much above 300° F., since temperatures below 300° F. are sufficient to provide the desired characteristics of the active ingredients.

The time required for heating the composition will generally be that of reaching the desired temperature. Usually, because of convenience, the composition will be held at the desired temperature for 30 seconds or more. Rarely will the time exced about 1 hour, and will generally be in the range from about 1 minute to 30 minutes. While longer times may be used, the longer times have not provided any noticeable advantage and are therefore undesirable for economic and convenience reasons.

Usually, atmospheric pressure will be used, although higher or lower pressures may be used as desired. However, during the heating, some water will evaporate. The removal of water appears necessary to this invention and to that effect, atmospheric or subatmospheric pressures are preferred. The water comes from the formation of the amide (when amines and fatty acids are used) and from partial dehydration of the water from calcium acetate monohydrate.

The carboxylic acid amide or amine acid salt in the complex with calcium acetate will generally be of from about 4 to 60 carbon atoms, more usually 10 to 50 carbon atoms, having from 1 to 5 nitrogens present as amino groups. The complex which forms between the carboxylic acid amine salt or amide and calcium acetate may be considered to have the following formula:

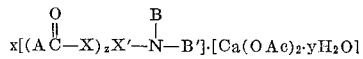

wherein A is an aliphatic hydrocarbon radical of from 1 to 29 carbon atoms, usually of 7 to 24 carbon atoms, X is either hydroxyl or taken together with X' a valence bond between the carbonyl and the nitrogen atom, X' when not taken together with X is either hydrogen or a hydrocarbyl radical (hydrocarbyl is an organic radical composed solely of carbon and hydrogen and may be aliphatic, alicyclic, aromatic, or combinations thereof, e.g., aralkyl); B is hydrogen or a hydrocarbyl radical and B' is hydrocarbyl or aminohydrocarbyl (aminohydrocarbyl is an organic radical composed solely of carbon, hydrogen, and nitrogen which may be aliphatic, alicyclic, aromatic, heterocyclic, or combinations thereof, e.g., aralkyl, wherein the nitrogen may be a member of the chain as in a ring or polyalkylene amines or pendant from the chain, e.g., 2-aminobutane); Ac is acetyl ($CH_3CO-$); X' and B will have from 0 to 20 carbon atoms and B' from 2 to 35 carbon atoms; $x$ is in the range of from 1.0 to 5 and indicates the mole ratio of the amine or amide salt to the calcium acetate; $y$ varies from 0 to 1 ($y$ need not be a whole number, indicating the average amount of water coordinated with calcium acetate), and $z$ is an integer of from 1 to the number of amine groups present, generally from 1 to 2.

The above formula is not intended to indicate the actual structure of the complex which exists in the hydrocarbon medium. Rather, it defines the relative ratios of the various materials present in the complex.

When more than 1 amino nitrogen is present in the amine portion of the complex, more than 1 carboxylic acid may be reacted with the amine to form polyamides or polysalts or mixed amides and salts. The polyamines may or may not have the nitrogen atoms separated by carbon atoms; preferably, the nitrogen atoms will be separated by at least 1 carbon atom, more usually by at least 2 carbon atoms. Furthermore, in the nature of the system, unless the preformed amide is added to the composition to form the complex, the complex may contain salts, mixtures of salts and amides or exclusively amides, depending upon its method of preparation and the particular compounds used. Therefore, salts or amides may be mono- or polybasic salts or mono- or polyamides or mixtures of the two. That is, one or more nitrogens per molecule may be bonded to carboxylic acids as salts and/or as amides. The above formula is therefore deficient in recognizing the possibility of the poly-substituted mixture of compounds and the complexity of the system which it attempts to describe.

When the complex is concerned solely or almost solely with the amine-carboxylic acid salt-calcium acetate complex, the complex may be described (subject to the deficiencies described above) by the following formula:

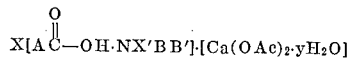

wherein A, B, B', Ac, $x$ and $y$ are as defined previously, and X' is either H or hydrocarbyl, preferably hydrogen.

When preformed amide is added to form the complex or the system is dehydrated to form the amide, the complex will have the following formula (subject to the deficiencies described above):

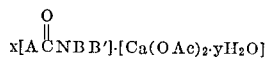

wherein A, B, B', Ac, $x$ and $y$ are as defined previously.

A preferred group of complexes have the following formula:

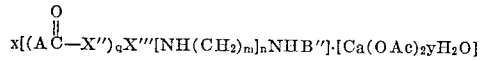

wherein A, Ac, $x$ and $y$ are as defined previously, X'' is hydroxyl or taken together with X''' a single valence bond to nitrogen, B'' is hydrogen or a hydrocarbyl radical of from 6 to 24 carbon atoms, X''' when not taken together with X'' is hydrogen, $m$ is an integer of from 1 to 3, $n$ is a cardinal number of from 0 to 2, and $q$ is equal to an integer in the range of 1 to $1+n$.

Turning now to a consideration of the materials used in the preparation of the novel compositions of this invention. The calcium acetate may be used in its dehydrated form or more commonly as its monohydrate. Alternatively, the calcium acetate may be formed in situ by neutralizing calcium hydroxide or calcium oxide with acetic anhydride or glacial acetic acid. The calcium acetate oil mixture may then be heated above 100° C. to drive off any water formed.

The amines which find use in this invention will generally have the following formula:

wherein $R^1$, $R^2$, and $R^3$ are hydrogen hydrocarbyl and aminohydrocarbyl radicals which may be taken together to form heterocyclic rings with the nitrogen to which they are attached, there being from 1 to 5 nitrogens and from 2 to 35 carbon atoms. $R^{1-3}$ (indicates $R^1$, $R^3$, and $R^3$) may be mono- or polyvalent, generally not more than divalent. While at least one of $R^{1-3}$ must be hydrocarbyl or aminohydrocarbyl, the other two R's may be hydrogen.

A particularly preferred group of amines has the following formula:

$$R^5NH[(CH_2)_mNH]_nH$$

wherein $R^5$ is an aliphatic hydrocarbyl radical of from 10 to 20 carbon atoms, $m$ is an integer of from 1 to 3, preferably 2 to 3, and $n$ is a cardinal number of from 0 to 2.

Illustrative of the various amines included in the above formulas are the following:

butylamine,
hexylamine,
octylamine,
decylamine,
dodecylamine,
tetradecylamine,
octadecylamine,
eicosylamine,
docosylamine,
hexacosylamine,
triacontylamine,
dodecenylamine,
hexadecenylamine,
octadecenylamine,
octadecadienylamine,
cyclohexylamine,
cyclo-octylamine,
cyclo-octenylamine,
aniline,
toluidine,
phenetidine,
o-, m-, p-phenylenediamine,
naphthylamine,
piperazine,
N-(2-aminoethyl)piperazine,
pyridine,
2-,4-amino-pyridine
pyrazine,
piperidine,
4-azaquinuclidine,
3-dodecylaminopropylamine,
2-hexadecylaminoethylamine,
2-octadecylaminoethylamine,
2-octadecadienylaminoethylamine,
3-octadecylaminopropylamine,
3-octadecadienylpropylamine,
4-octadecylaminobutylamine,
2-[(2-octadecylamino)ethylamino]ethylamine,
1,10-diaminodecane,
1,12-diaminododecane,
1,16-diaminohexadecane,
1,18-diaminooctadecane,
N,N-dimethylhexadecylamine,
ethylene diamine,
propylene diamine,
tetraethylene pentamine.

The carboxylic acids of this invention used in conjunction with the above amines are aliphatic mono- and polybasic carboxylic acids of from 2 to 30 carbon atoms, more usually of from 14 to 22 carbon atoms, and may be aliphatically saturated or have olefinic unsaturation, generally from 1 to 3 sites. The preferred acids are monobasic of from 16 to 20 carbon atoms, having from 0 to 2 sites of olefinic unsaturation. The aliphatic carboxylic acid may be branched- or straight-chain. It may be derived from naturally occuring materials or prepared synthetically.

Illustrative of the various aliphatic carboxylic acids which may be used in this invention are acetic acid, valeric acid, caproic acid, lauric acid, myristic acid, palmitic acid, oleic acid, linoleic acid, stearic acid, elaidic acid, behenic acid, gadolenic acid, erucic acid, brassidic acid, arachidic acid, naphthenic acids, etc.

The fluid medium which is used in the preparation of the complexes of this invention is most usually an oil of lubricating viscosity. Such oils include hydrocarbons derived from natural sources, e.g., petroleum: paraffinic, naphthenic, aromatic, mixed, etc., and synthetic sources, e.g., polyalkylene. Also, organic esters, e.g., carboxylic esters and inorganic esters, e.g., silicates. Also, polyalkylene glycols and their ether and ester derivatives The lubricating oils which find use will have a viscosity at 210° F. of about 30 to 300 SUS, more usually about 30 to 150 SUS, and viscosity indexes of about 0 to +100.

Generally, the hydrocarbon medium will be derived from petroleum sources. The oils derived from natural sources may be clay treated, acid treated, hydrofined or treated by other methods well known in the art. Preferably, the oils will be solvent treated, that is, relatively free of sulfur and nitrogen.

The following examples are offered by way of illustration and not by way of limitation.

Example 1

Into a reaction flask fitted with a high speed stirrer was introduced 10 parts of calcium acetate monohydrate, 3.7 parts of N-octadecenyl-1,3-propylenediamine as its oleate salt and 86.3 parts of a naphthenic base oil having a viscosity at 210° F. of 85 to 95 SUS and heated on a hot plate until the temperature reached 300° F., at which time the mixture was removed from the heat source.

The above mixture provided a concentrate which could be used with a variety of other oils to impart desirable properties to those oils.

Example 2

Into a Waring Blendor was introduced 0.81 parts of DABCO (triethylenediamine), 4.11 parts of oleic acid, 5.08 parts of calcium monohydrate and 90 parts of neutral oil SAE 130 and the mixture heated to 300° F. with vigorous stirring, at which time the heating was stopped.

Example 5

Following the procedure of Example 1, 270 parts of SAE 130 Neutral Oil, 17.4 parts of oleic acid, 1.83 parts of ethylenediamine and 10.77 parts of calcium acetate monohydrate were heated to 280° F.

Example 6

Following the procedure of Example 1, 270 parts of SAE 130 Neutral Oil, 16.56 parts of oleic acid, 3.15 parts of meta-phenylene diamine and 10.29 parts of calcium acetate monohydrate were mixed and heated to 300° F.

Example 7

Following the procedure of Example 1, 90 parts of SAE 130 Neutral Oil, 6.9 parts of Duomeen T dicaproate [1], and 3.1 parts of calcium acetate monohydrate were mixed and heated to 280° F.

The compositions of this invention are particularly useful as viscosity index improvers. As viscosity index improvers, usually the solids will be from about 0.01 to 1 weight percent of the total oil blend, more usually from about 0.02 to 0.5 weight percent of the total oil blend. The concentrate of the active ingredients may be added in the desired proportions to the oil to provide the ultimately desired concentration of the oil blend.

The following table indicates the results obtained using calcium acetate monohydrate in combination with the oleate salt of N-octadecy-1,3-propylenediamine. Various combinations of the amine salt with the calcium acetate were used, as well as different processing temperatures. Mixing temperatures when combining the concentrate with the oil to form the ultimate blend are also reported. Elevated temperatures are useful in lowering the viscosity to aid agitation. In each example, concentrates having 10 percent solids were mixed with a solvent-refined naphthenic base oil having a viscosity at 100° F. of 27.7 cs. and a viscosity index of 95.

The following table indicates the results:

TABLE I

| Concentrate | | Oil Blend | | Viscosity Data | | |
|---|---|---|---|---|---|---|
| Composition Ratio[1] | Processing Temp. °F. | Conc. of Complex Wt. Percent | Mixing Temp. °F. | cs.[100] | cs.[210] | V.I. |
| 2:1 | 200 | 0.6 | 77 | 32.5 | 5.614 | 122 |
| 2:1 | 240 | 0.6 | 77 | 33.3 | 5.77 | 125 |
| 2:1 | 420 | 0.6 | 77 | 130.9 | 21.25 | 142 |
| 2:1 | 300 | 0.1 | 400 | 43.69 | 7.18 | 130 |
| 5:1 | 280 | 0.1 | 77 | 40.06 | 7.503 | 145 |
| 2:1 | 420 | 0.1 | 200 | 64.44 | 9.973 | 134 |
| 2:1 | 420 | 0.06 | 200 | 44.10 | 7.047 | 124 |
| 2:1 | 220 | 1.0 | 200 | 62.97 | 14.78 | 159 |
| 2:1 | 220 | 0.5 | 200 | 42.04 | 8.715 | 156 |
| 2:1 | 220 | 0.1 | 200 | 31.96 | 5.848 | 138 |
| 2:1 | 220 | 0.04 | 200 | 28.67 | 4.905 | 103 |
| 2.25:1 | 280 | 0.08 | 77 | 35.79 | 6.256 | 132 |

[1] Ratio of weight of a 74 percent active oil solution of N-octadecyl-1,3-propylenediamine to the weight of $Ca(OAc)_2 \cdot H_2O$.

Example 3

Into a Waring Blendor was introduced 80.2 parts of tallow amine, 86.5 parts of oleic acid, 83.2 parts of calcium acetate monohydrate and 225 parts of SAE 130 Neutral Oil and the mixture vigorously agitated while heating until the temperature reached 300° F., at which time heating was stopped.

Example 4

Following the procedure of Example 1, 90 parts of SAE 130 Neutral Oil, 334 parts of hydrogenated tallow amine, 3.55 parts of oleic acid and 3.1 parts of calcium acetate monohydrate were heated to 280° F.

A variety of other hydrocarbon media were also shown to be capable of viscosity index improvement and at higher concentrations of the complex to be capable of gellation. The complex used was a 2:1 weight ratio of the oleate salt of N-oleylpropylene-1,3-diamine and calcium acetate monohydrate processed to 280° F. The following data indicates the weight percent, the viscosity, the viscosity index improvement and the amount required for gelation.

---

[1] Duomeen T is a mixture of aliphatic diamines supplied by Armour Chemical Company of the formula

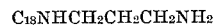

the $C_{18}$ having 0 to 2 site of olefinic unsaturation.

TABLE II

| Hydrocarbon Medium | Complex Conc. Wt. Percent | Viscosity | | | Gelation Conc. Wt. Percent |
|---|---|---|---|---|---|
| | | cs.$^{100}$ | cs.$^{210}$ | V.I. | |
| Primarily Aromatic Thinner | | | | | 0.5 |
| Primarily Aliphatic Thinner | | | | | 1.0 |
| Neutral Oil, SAE 50 | 0.05 | 8.57 | 2.68 | 170 | 0.1 |
| Neutral Oil, SAE 130 | 0.1 | 38.19 | 7.00 | 147 | 0.1 |
| Neutral Oil, SAE 480 | | | | | 0.25 |
| Pale Oil, Visc. 210° F., 85 to 95 SUS | | | | | 0.25 |

The compositions disclosed herein are also useful as viscosity index improvers in higher viscosity oils for EP gear oils. For example, a mineral oil with a viscosity of 8.7 cs. at 210° F. and having a viscosity index of 90 was thickened to 27 cs. at 210° F. This composition, which is a multigrade SAE 75–80–90–140 gear lube with a viscosity index of 144, contains 25 weight percent $$Ca(OAc)_2 \cdot H_2O$$

and 1 weight percent N-oleylpropylene-1,3-diamine monooleate. In this case the $Ca(OAc)_2 \cdot H_2O$ was prepared in situ in the oil using 2 weight percent petroleum sulfonate as a dispersant. The amine salt thickened the dispersion and imparted excellent shear stability in a Sonic Oscillator Test. The test apparatus is described in Volume I (1961), of ASTM Committee D–2, appendix 12; a power setting of 20 was used in the test. The following graph describes the results for the composition as compared to a typical commercially available viscosity index improver.

GRAPH I

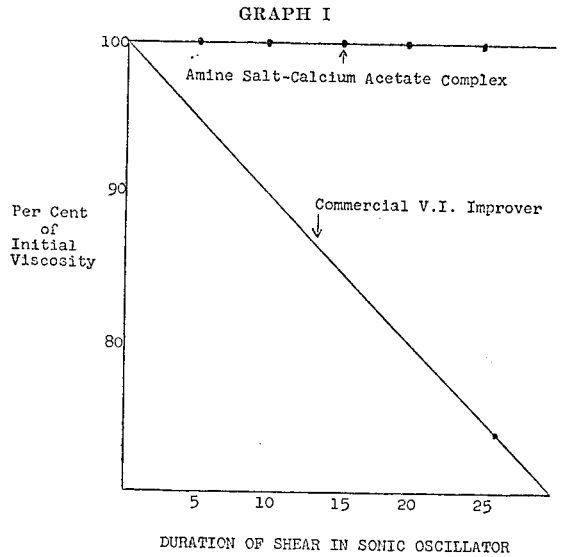

DURATION OF SHEAR IN SONIC OSCILLATOR

It is evident from the above graph that not only does the amine salt-calcium acetate complex maintain its viscosity index improvement capability, but actually shows a slight increase, while the commercially available viscosity index improver diminishes rapidly.

The novel complexes of this invention may be used with a variety of other lubricating oil additives. Such materials as rust inhibitors, detergents, other viscosity index improvers and thickeners, corrosion inhibitors, extreme pressure agents, pour point depressants, etc. When referring to the novel compositions of this invention, it is intended to include only those ingredients necessary to impart the properties obtained with the calcium acetate-carboxylic acid amino salt or amide complex. Therefore, while the examples of this invention are mainly restricted to hydrocarbon media and to the active ingredients, it is intended that these compositions may be used with a variety of other additives and in a variety of other fluids.

The carboxylic acid amine salt or amide-calcium acetate complex has been demonstrated to be an excellent viscosity index improver and gelant in a wide variety of hydrocarbon media. The complexes also find use as thickeners for greases as well as the multifold purposes for which calcium acetate finds application in hydrocarbon media, e.g., extreme pressure additives, detergents, corrosion inhibitors, rust preventives, antiwear agents, etc.

The dispersions in hydrocarbon media have been shown to be stable over long periods of time at ambient temperatures, as well as elevated temperatures. Therefore, by use of the novel complexes of this invention, stable dispersions of ionic materials are maintained in oil media while imparting desirable properties to the oil media.

As will be evident to those skilled in the art, various modifications on this process can be made or followed, in the light of the foregoing disclosure and discussion, without departing from the spirit or scope of the disclosure or from the scope of the following claims.

I claim:

1. A composition having viscosity index improving and gelling properties comprising a major portion of a liquid hydrocarbon and from about 0.01 to 35 weight percent of the composition of a complex of the formula:

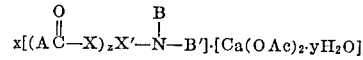

wherein A is an aliphatic hydrocarbon radical of from 7 to 24 carbon atoms, X is hydroxyl and when taken together with X' a valance bond between the carbonyl and the nitorgen atom, X' is selected from the group consisting of hydrogen, a hydrocarbyl radical, and a valance bond when taken together with X, B is selected from the group consisting of hydrogen and a hydrocarbyl radical, B' is selected from the group consisting of hydrocarbyl and amino-hydrocarbyl, Ac is acetyl, x is a number from 1.0 to 5, y varies from 0 to 1, z is an interger of from 1 to the total number of nitrogen atoms in NX'BB', said complex having from 4 to 60 carbon atoms and from 1 to 5 nitrogen atoms.

2. A composition according to claim 1 wherein X and X' form a valence bond.

3. A composition according to claim 1 wherein X is hydroxyl and X' is hydrogen.

4. A composition having viscosity index improving and gelling properties comprising a major portion of a liquid hydrocarbon and from about 0.01 to 35 weight percent of the composition of a complex of the formula:

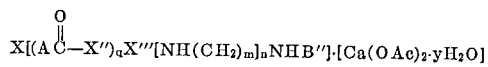

wherein A is an aliphatic hydrocarbon radical of from 7 to 24 carbon atoms, Ac is acetyl, x is a number from 1.0 to 5, y varies from 0 to 1, X" is hydroxyl and when taken with X''' a single valence bond between the carbonyl and nitrogen, B" is selected from the group consisting of hydrogen and hydrocarbyl radicals of from 6 to 24 carbon atoms, X''' except when taken together with X" is hydrogen, m is an integer from 1 to 3, n is a cardinal number from 0 to 2 and $q$ is in the range of 1 to $1+n$.

5. A composition having viscosity index improving and gelling properties comprising a major portion of an oil of lubricating viscosity and from about 0.01 to 35 weight percent of the composition of a complex of the oleate salt of N-octadecenyl-1,3-propylenediamine with calcium acetate, wherein the mole ratio of said salt with said calcium acetate is in the range of 1.0–5:1.

References Cited by the Examiner

UNITED STATES PATENTS 2,940,932  6/1960  Morway _____ 252—40.7
3,182,020  5/1965  Davis _____ 252—51.5

DANIEL E. WYMAN, *Primary Examiner.*

IRVING VAUGHN, *Assistant Examiner.*